United States Patent [19]

Stewart

[11] 3,812,303

[45] May 21, 1974

[54] DIFFERENTIAL LOOP CURRENT DETECTOR

[75] Inventor: Edward F. Stewart, Raleigh, N.C.

[73] Assignee: International Telephone and Telegraph Corporation, Nutley, N.J.

[22] Filed: Oct. 11, 1972

[21] Appl. No.: 296,727

[52] U.S. Cl. .......................... 179/175.3 R, 324/51

[51] Int. Cl. .......................................... H04b 3/46

[58] Field of Search ........... 179/175.3, 175; 324/51, 324/98

[56] References Cited

UNITED STATES PATENTS

| | | | |
|---|---|---|---|
| 3,699,392 | 10/1972 | Lee et al. | 324/51 |
| 1,459,770 | 6/1923 | Jones | 179/175.3 |
| 1,407,983 | 2/1922 | Clark et al. | 179/175.3 |

*Primary Examiner*—Kathleen H. Claffy
*Assistant Examiner*—Douglas W. Olms
*Attorney, Agent, or Firm*—John T. O'Halloran; Menotti J. Lombardi, Jr.; Alfred C. Hill

[57] ABSTRACT

There is disclosed a solid state differential loop current detector to detect and measure current unbalance in a two wire telephone cable connected in a direct current loop configuration wherein the current unbalance is due to paths to ground potential from the telephone cable. The detector includes a first solid state operational amplifier appropriately connected to an input terminal supplying a voltage to the adjacent end of one wire of the telephone cable and to the adjacent end of the one wire of the telephone cable and a second solid state operational amplifier appropriately connected to the output of the first amplifier and to the adjacent end of the other wire of the telephone cable. The second amplifier produces an output voltage having an amplitude proportional to the magnitude of the current unbalance.

13 Claims, 2 Drawing Figures

DIFFERENTIAL LOOP CURRENT DETECTOR

BACKGROUND OF THE INVENTION

This invention relates to a differential loop current detector to detect current unbalance in a two wire telephone cable connected in a direct current loop configuration wherein the current unbalance is due to paths to ground potential from a telephone cable.

Differential loop current detectors of the prior art employed relay devices that are difficult to adjust and maintain.

SUMMARY OF THE INVENTION

An object of the present invention is to provide a differential loop current detector which does not require maintenance.

Another object of the present invention is to provide a solid state differential loop current detector which does not require maintenance.

A feature of the present invention is the provision of a solid state differential loop current detector to detect and measure current unbalance in a two wire telephone cable connected in a direct current loop configuration, the current unbalance being due to paths to ground potential from the cable, comprising: a voltage input terminal; a first resistor coupled between the input terminal and the adjacent end of one wire of the cable; a second resistor coupled between the adjacent end of the other wire of the cable and the ground potential; a first solid station operational amplifier having a non-inverting input, an inverting input and an output, one of the inputs of the first amplifier being coupled to the input terminal and the other of the inputs of the first amplifier being coupled to the adjacent end of the one wire of the cable; a third resistor coupled between the output of the first amplifier and the inverting input of the first amplifier; a second solid state operational amplifier having a non-inverting input, an inverting input and an output, one of the inputs of the second amplifier being coupled to the adjacent end of the other wire of the cable and the inverting input of the second amplifier being coupled to the output of the first amplifier; and a fourth resistor coupled between the output of the second amplifier and the inverting input of the second amplifier; the output of the second amplifier providing a voltage having an amplitude proportional to the magnitude of the current unbalance.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
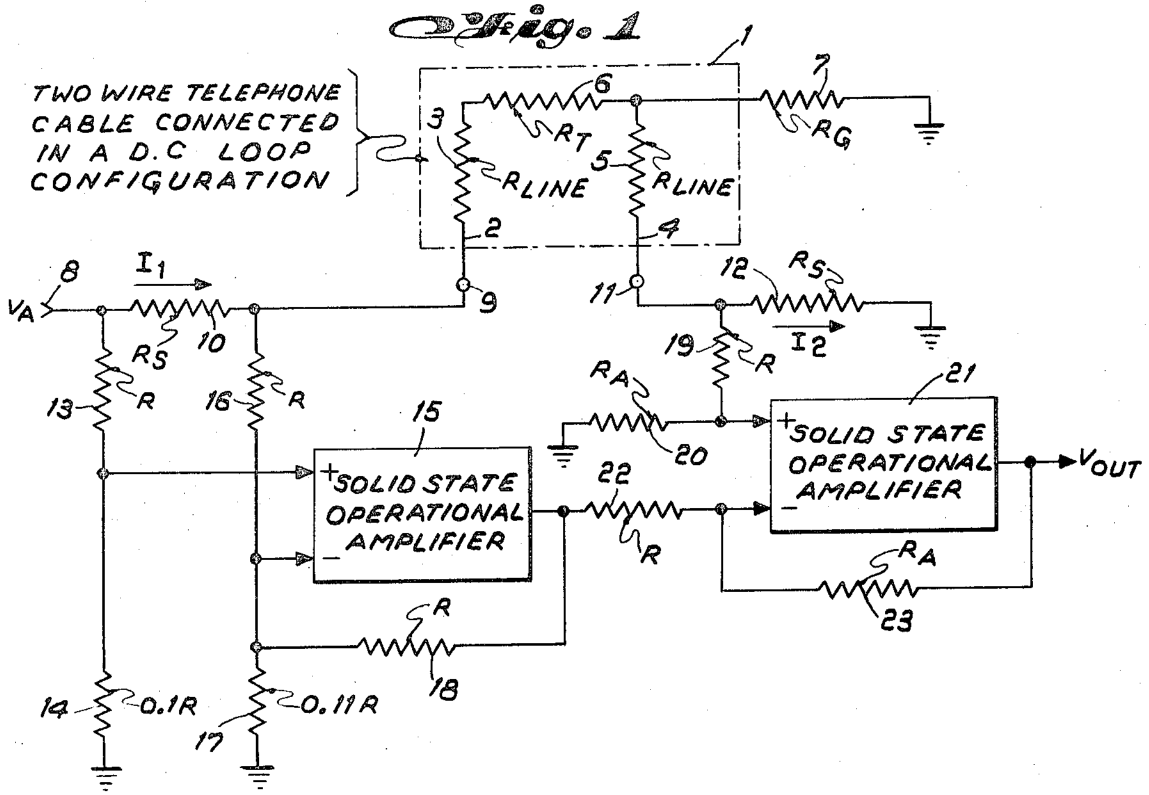
FIG. 1 is a schematic diagram of one embodiment of a solid state differential loop current detector in accordance with the principles of the present invention.
Figure 2:
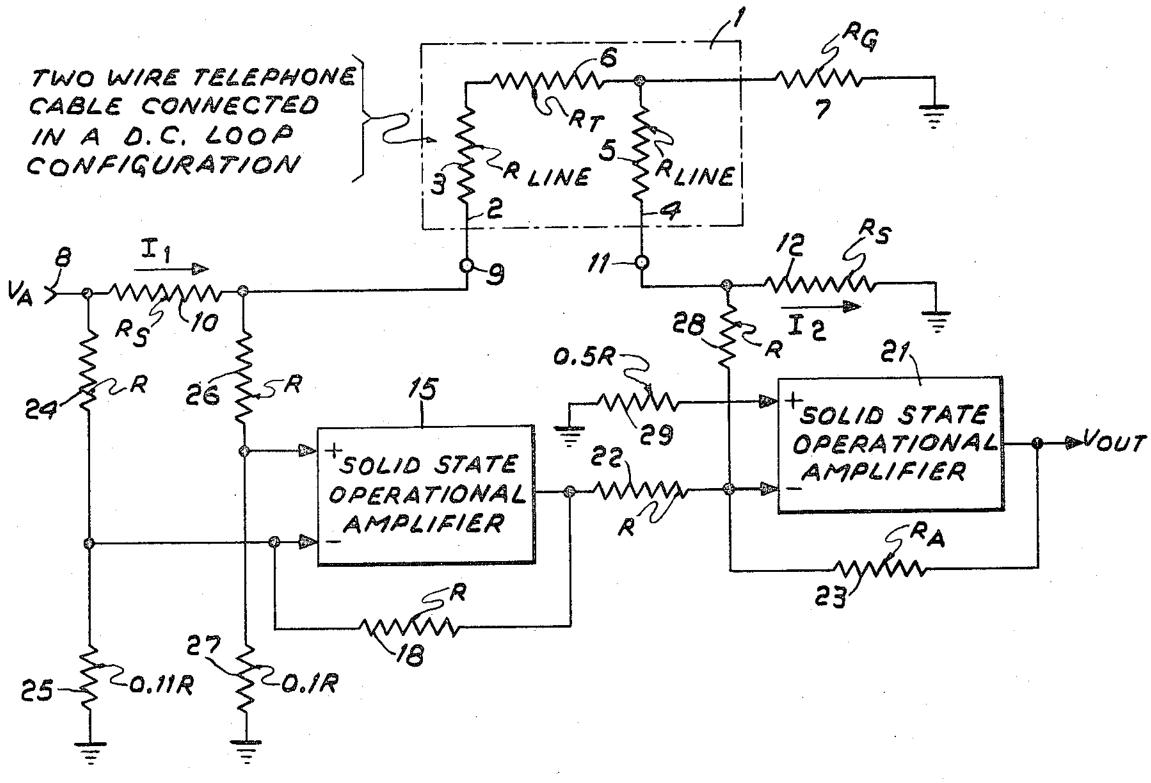
FIG. 2 is a schematic diagram of another embodiment of a solid state differential loop current detector in accordance with the principles of the present invention.

Referring to FIGS. 1 and 2, the dotted block 1 illustrates the equivalent circuit of a two wire telephone cable connected in a DC (direct current) loop configuration. One of the wires 2 of the cable has an equivalent resistor 3 equal to the resistance of wire 2 and the other wire 4 of the cable has an equivalent resistor 5 equal to the resistance of the wire 4. The connection of wires 2 and 4 at their remote end to provide a DC loop configuration is illustrated by the equivalent resistor 6. A path from the cable to ground potential is illustrated to be equivalent resistor 7. Resistor 7 causes a current unbalance in the DC loop configuration which is to be detected and measured by the solid state differential loop current detector of the present invention.

A DC voltage $V_A$ is applied to input terminal 8. Input terminal 8 is connected to the adjacent end 9 of wire 2 by means of resistor 10, resistor 10 having a current $I_1$ flowing therethrough for application to wire 2. The adjacent end 11 of wire 4 is connected to ground potential by resistor 12 which has a current $I_2$ flowing therethrough.

The embodiments of the solid state differential loop current detector of the present invention shown in FIGS. 1 and 2 has the object of measuring the difference between currents $I_1$ and $I_2$ with this difference enabling the detection of current unbalance in the DC loop of the block 1 caused by paths to ground potential from the cable.

Referring to FIG. 1, an embodiment of the solid state differential loop current detector is disclosed therein in schematic diagram. Resistors 13 and 14 are connected in series with each other between terminal 8 and ground potential with the junction of resistors 13 and 14 being coupled to the non-inverting input, the + input, of solid state operational amplifier 15. Resistors 16 and 17 are connected in series with each other and between adjacent end 9 of wire 2 and ground potential with the junction of resistors 16 and 17 being coupled to the inverting input, the − input, of operational amplifier 15. A feedback from the output of amplifier 15 to the inverting input of amplifier 15 is provided by resistor 18. Resistors 19 and 20 are coupled in series with each other and between the adjacent end 11 of wire 4 and ground potential with the junction of resistors 19 and 20 being connected to the non-inverting input of solid state operational amplifier 21. The inverting input of amplifier 21 is connected by resistor 22 to the output of amplifier 15. A feedback from the output of amplifier 21 to the inverting input of amplifier 21 is provided by resistor 23. The output of amplifier 21 provides a voltage $V_{OUT}$ having an amplitude which is proportional to the magnitude of the current unbalance due to ground paths in the DC loop configuration of the two wire telephone cable. $V_{OUT}$ of the embodiment of FIG. 1 can be expressed by the following equation:

$$V_{OUT} = (R_A/R)\, R_S\, (I_1 - I_2) - R_S I_2 \qquad (1)$$

In a reduction to practice of the embodiment of FIG. 1 the various indicated resistors had the following values:

$R_S = 51.1$ ohms
$R = 100$ kilohms
$R_A = 3.3$ megohms
$(R_T + 2R_{LINE}) = 200$ to 2,000 ohms
$R_G = 1{,}000$ ohms to infinity The operation of the detector of FIG. 1 is as follows. Resistors 13 and 14 form a voltage divider from the input voltage terminal 8 to obtain a convenient reference point for the non-inverting input of differential amplifier 15. Resistor 16 in series with resistor 17 also form a similar voltage divider for the inverting input of amplifier 15. Resistor 17 is chosen so that when no current is flowing in resistor 10, (telephone cable loop 1 is open circuited and the potential is equal at points 8 and 9) the output of amplifier 15 is at ground potential, resistor 18 being effectively in parallel with resistor 17 in this situation only. Resistors 16, 17 and 18 also set the gain of amplifier 15 to provide gain equal to the voltage division ratio of resistors 13 and 14. The characteristic that no potential difference may exist between the inputs of an essentially infinite gain amplifier is used to calculate the values for resistors 17 and 18. When current flows in resistor 10 the potential at point 9 is then lower than the potential at point 8 by the current times the value of resistance of resistor 10. This lower potential causes less current to flow in resistor 16 and amplifier 15 will change its output so that the sum of the currents in resistors 16 and 18 remains the same to maintain the same voltage at the inverting input of amplifier 15 and therefore across resistor 17. The change of the output potential of amplifier 15 that satisfies this condition is equal in magnitude and opposite in direction to the change that occurred across resistor 10. The output of amplifier 15 is referenced to ground and is equal in magnitude and opposite in direction to the potential drop across resistor 10. The output signal of amplifier 15 is applied to the inverting input of amplifier 21 through resistor 22. The current $I_2$ through resistor 12 raises the potential at point 11 above the ground potential by an amount equal to the current $I_2$ times the resistance value of resistor 12. Since resistor 12 is equal in value to resistor 10, the potential difference across resistor 12 has the same magnitude as the potential difference across resistor 10 if and only if the currents through these two resistors are equal. These currents are equal if there are no paths to ground potential in telephone cable 1 (resistor 7 being infinite resistance.) The potential at point 11 is applied to the non-inverting input of amplifier 21. Since amplifier 15 inverted the direction of the potential drop across resistor 10 and changed the reference from the input voltage terminal 8 to ground but duplicated the magnitude of the change, the potential at the output of amplifier 15 is equal to the potential at point 11 so long as the currents $I_1$ and $I_2$ are equal. Resistor 23 in conjunction with resistor 22 sets the gain of amplifier 22 to a value large enough to provide a convenient output signal. Resistor 20 is equal to resistor 23 to minimize the common mode gain of amplifier 21 to minimize the effect of the absolute value of the current $I_2$ on the output signal. Two signals of same polarity are applied to the two inputs of amplifier 21 and the difference between them is then amplified by amplifier 21 to provide the output signal. If the two signals are equal in magnitude ($I_1 = I_2$) there is no change in the output of amplifier 21 but if there is a difference in magnitude between the two signals ($I_1 \neq I_2$) caused by a resistance to ground somewhere between point 9 and point 11 this difference is detected and amplified by the circuit. Equation 1 describes the output signal for the detector of FIG. 1.

Referring to FIG. 2, a second embodiment of the solid state differential loop current detector of the present invention is disclosed in schematic diagram form. The difference between the embodiment of FIG. 2 and the embodiment of FIG. 1 is the manner in which the inputs of solid state operational amplifier 15 is connected to input terminal 8 and adjacent end 9 of wire 2 and the inputs of solid state operational amplifier 21 is connected to the adjacent end 11 of wire 4. Resistors 24 and 25 are connected in series with each other and between input terminal 8 and ground potential with the junction of resistors 24 and 25 being connected to the inverting input of amplifier 15. Resistors 26 and 27 are connected in series with each other and between the adjacent end 9 of wire 2 and ground potential with the junction of resistors 26 and 27 being connected to the non-inverting input of amplifier 15. Resistor 18 is connected in the feedback path between the output of amplifier 15 and the inverting input of amplifier 15. Resistor 28 is connected between the adjacent end 11 of wire 4 and the inverting input of amplifier 21. The non-inverting input of amplifier 21 is connected by resistor 29 to ground potential. Resistor 22 is still connected between the output of amplifier 15 and the inverting input of amplifier 21. Resistor 23 is connected in the feedback path between the output and inverting input of amplifier 21. The output of amplifier 21 provides a voltage $V_{OUT}$ which has an amplitude proportional to the magnitude of the current unbalance and can be expressed by the following equation:

$$V_{OUT} = (R_A/R)\, R_S\, (I_1 - I_2) \tag{2}$$

In a reduction to practice of the embodiment illustrated in FIG. 2 the resistors $R_S$, $R$, $R_A$, $(R_T + 2\,R_{LINE})$ and $R_G$ had the same values as set forth hereinabove with respect to the embodiment of FIG. 1.

The operation of the detector of FIG. 2 is the same as the detector of FIG. 1 with the following differences. The detector of FIG. 2 differs from the detector of FIG. 1 in the fact that the connections between the inputs of amplifier 15 and points 8 and 9 are reversed and therefore amplifier 15 does not invert the direction of the signal from resistor 10. The output of amplifier 15 is applied to the inverting input of amplifier 21 along with the potential at point 11 through resistors 22 and 28, respectively. In FIG. 2 the two signals are opposite in direction and therefore cancel each other only when they are equal in magnitude. Resistor 29 serves only to provide a reference to the non-inverting input of amplifier 21 of an impedance similar to the impedance connected to the inverting input minimizing the effects of the bias currents required by amplifier 21. Equation 2 describes the output signal for the detector of FIG. 2.

While I have described above the principles of my invention in connection with specific apparatus it is to be clearly understood that this description is made only by way of example and not as a limitation to the scope of my invention as set forth in the objects thereof and in the accompanying claims.

I claim:

1. A solid state differential loop current detector to detect and measure current unbalance in a two wire telephone cable connected in a direct current loop configuration, said current unbalance being due to paths to ground potential from said cable, comprising:

a voltage input terminal;

a first resistor coupled between said input terminal and the adjacent end of one wire of said cable;

a second resistor coupled between the adjacent end of the other wire of said cable and said ground potential;

a first solid state operational amplifier having a non-inverting input, an inverting input and an output, one of said inputs of said first amplifier being coupled to said input terminal and the other of said inputs of said first amplifier being coupled to said adjacent end of said one wire of said cable;

a third resistor coupled between said output of said first amplifier and said inverting input of said first amplifier;

a second solid state operational amplifier having a non-inverting input, an inverting input and an output, one of said inputs of said second amplifier being coupled to said adjacent end of said other wire of said cable and said inverting input of said second amplifier being coupled to said output of said first amplifier; and a fourth resistor coupled between said output of said second amplifier and said inverting input of said second amplifier;

said output of said second amplifier providing a voltage having an amplitude proportional to the magnitude of said current unbalance.

2. A detector according to claim 1, wherein said non-inverting input of said first amplifier is coupled to said input terminal and said inverting input of said first amplifier is coupled to said adjacent end of said one wire of said cable.

3. A detector according to claim 1, wherein said non-inverting input of said second amplifier is coupled to said adjacent end of said other wire of said cable.

4. A detector according to claim 1, wherein said non-inverting input of said first amplifier is coupled to said input terminal, said inverting input of said first amplifier is coupled to said adjacent end of said one wire of said cable and said non-inverting input of said second amplifier is coupled to said adjacent end of said other wire of said cable.

5. A detector according to claim 1, wherein said inverting input of said first amplifier is coupled to said input terminal and said non-inverting input of said first amplifier is coupled to said adjacent end of said one wire of said cable.

6. A detector according to claim 1, wherein said inverting input of said second amplifier is coupled to said adjacent end of said other wire of said cable.

7. A detector according to claim 1, wherein said inverting input of said first amplifier is coupled to said input terminal, said non-inverting input of said first amplifier is coupled to said adjacent end of said one wire of said cable and said inverting input of said second amplifier is coupled to said adjacent end of said other wire of said cable.

8. A detector according to claim 1, further including a fifth resistor and a sixth resistor connected in series between said input terminal and said ground potential and said non-inverting input of said first amplifier is coupled to the junctions of said fifth and sixth resistors, and seventh and eighth resistors connected in series between said adjacent end of said one wire of said cable and said ground potential and said inverting input of said first amplifier is coupled to the junctions of said seventh and eighth resistors.

9. A detector according to claim 1, further including a fifth resistor and a sixth resistor connected in series between said adjacent end of said other wire of said cable and said ground potential and said non-inverting input of said second amplifier is coupled to the junction of said fifth and sixth resistors, and a seventh resistor connected between said output of said first amplifier and said inverting input of said second amplifier.

10. A detector according to claim 1, further including a fifth resistor and a sixth resistor connected in series between said input terminal and said ground potential and said non-inverting input of said first amplifier is coupled to the junction of said fifth and sixth resistors, seventh and eighth resistors connected in series between said adjacent end of said one wire of said cable and said ground potential and said inverting input of said first amplifier is coupled to the junction of said seventh and eighth resistors, ninth and tenth resistors connected in series between said adjacent end of said other wire of said cable and said ground potential and said non-inverting input of said second amplifier is coupled to the junction of said ninth and tenth resistors, and an eleventh resistor connected between said output of said first amplifier and said inverting input of said second amplifier.

11. A detector according to claim 1, further including fifth and sixth resistors connected in series between said input terminal and said ground potential and said inverting input of said first amplifier is connected to the junction of said fifth and sixth resistors, and seventh and eighth resistors connected in series between said adjacent end of said one wire of said cable and said ground potential and said non-inverting input of said first amplifier is connected to the junction of said seventh and eighth resistors.

12. A detector according to claim 1, further including a fifth resistor connected between said adjacent end of said other wire of said cable and said inverting input of said second amplifier, a sixth resistor connected between said output of said first amplifier and said inverting input of said second amplifier, and a seventh resistor connected between said non-inverting input of said second amplifier and said ground potential.

13. A detector according to claim 1, further including fifth and sixth resistors connected in series between said input terminal and said ground potential and said inverting input of said first amplifier is connected to the junction of said fifth and sixth resistors, seventh and eighth resistors connected in series between said adjacent end of said one wire of said cable and said ground potential and said non-inverting input of said first amplifier is connected to the junction of said seventh and eighth resistors, a ninth resistor connected between said adjacent end of said other wire of said cable and said inverting input of said second amplifier, a tenth resistor connected between said output of said first amplifier and said inverting input of said second amplifier, and an eleventh resistor connected between said non-inverting input of said second amplifier and said ground potential.

* * * * *